April 21, 1953     J. H. NELLIS     2,635,640
DIAPHRAGM MOUNTING

Filed Feb. 12, 1948     5 Sheets-Sheet 1

INVENTOR.
James H. Nellis
BY Spencer Hardman and Fehr
Attorneys

INVENTOR.
BY James H Nellis
Spencer Hardman and John
attorneys

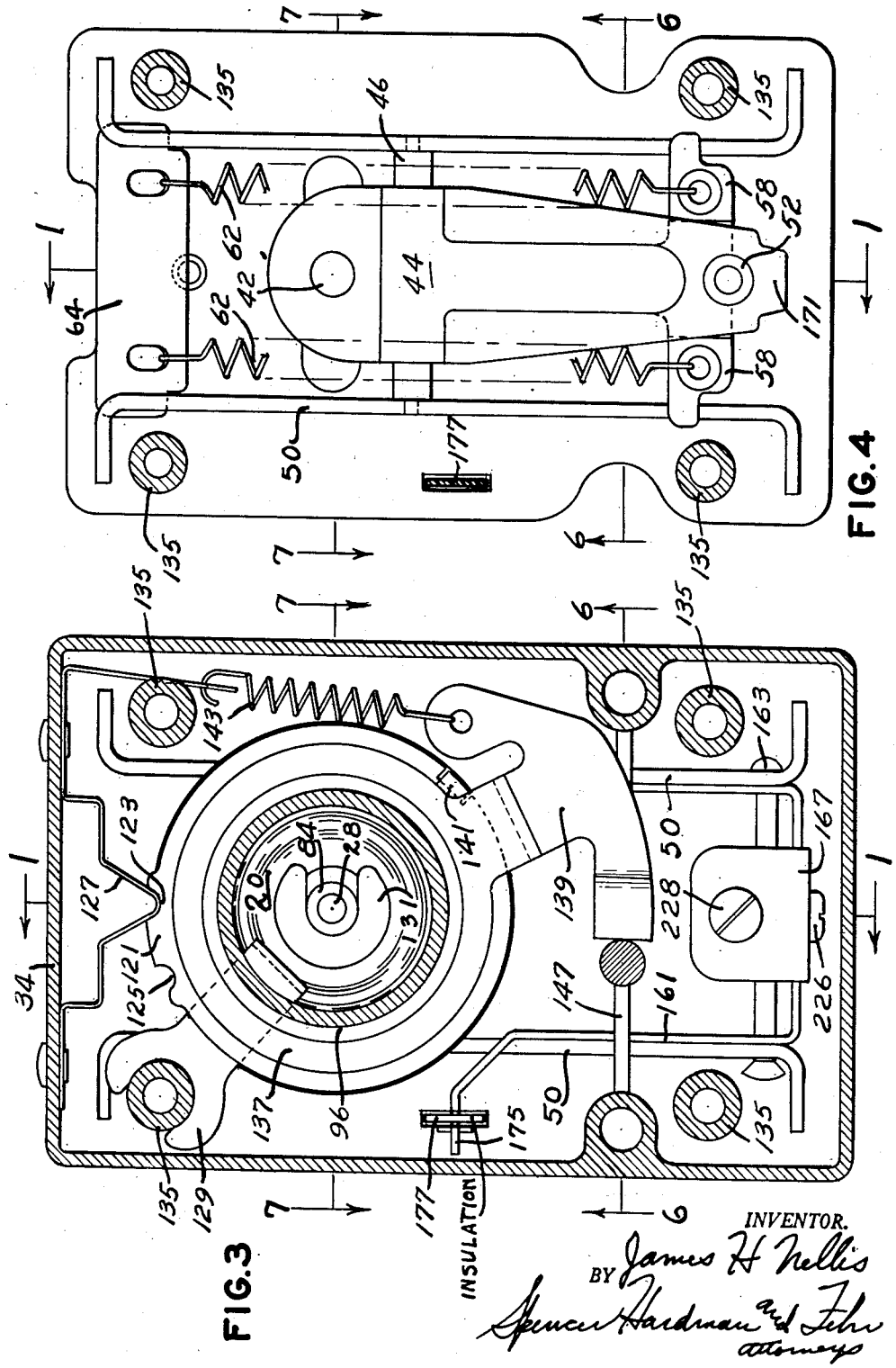

INVENTOR.
James H. Nellis
BY Spencer Hardman and Fehr
attorneys

April 21, 1953 J. H. NELLIS 2,635,640
DIAPHRAGM MOUNTING
Filed Feb. 12, 1948 5 Sheets-Sheet 5

INVENTOR.
By James H. Nellis
Spencer Hardman and John
Attorneys

Patented Apr. 21, 1953

2,635,640

UNITED STATES PATENT OFFICE 2,635,640

DIAPHRAGM MOUNTING

James H. Nellis, Dayton, Ohio, assignor to General Motors Corporation, Dayton, Ohio, a corporation of Delaware Application February 12, 1948, Serial No. 7,882

2 Claims. (Cl. 137—784)

1

This invention relates to controls particularly intended for use with an electric range, but which have many features applicable to other controls.

It is an object of my invention to provide a simple, quick and easy means for accurately calibrating and recalibrating the control device without the use of customary obstinate locking devices.

To attain these objects I have provided a wafer type diaphragm means with an offset welded radial flange. This diaphragm means operates the primary lever of a snap-action mechanism which is connected by a thin metal member to one end of a toggle lever which is linked to one leg of each of two L-shaped contact members. A toggle spring is connected to the other end of the toggle lever and maintains a tension upon the tension member and provides the force for snap-action.

The interior of the wafer type diaphragm member is connected by a tube to an ordinary thermostat bulb which is charged with an expansible liquid. This tube prevents rotation of the diaphragm means. The diaphragm means is provided with a rotatable connection with an externally threaded member. An arm having a friction connection with the externally threaded member normally prevents its rotation. The externally threaded member is surrounded by and in threaded engagement, with an internally threaded member rotatably mounted in the switch case. A knob is provided on the internally threaded member. The normal temperature adjustment is accomplished by rotating the knob and the internally threaded member relative to the internally threaded member to move the diaphragm means inwardly or outwardly according to the temperature selected. If it is desired to change the calibration, the internally threaded member is prevented from rotating and the plug is forcibly rotated relative to the internally threaded member to change the position of the diaphragm means.

The internally threaded member in the broil position operates a cam which lifts the second leg of each of the L-shaped contacts to disconnect both ends of the lower heating unit. A U-shaped member, also operated by this cam, is provided with an arm which operates the preheat-bake switch to lift it into the preheat position. An adjunct to this U-shaped member is used to provide an automatic preheat-bake control in which the preheat-bake change is made before the temperature is attained to which the thermostat is set. To this end the U-shaped member which

2 operates the preheat-bake switch has a projection with a shoulder thereon which in the preheat or broil position rests against the end of the primary lever of the snap-action switch mechanism. This holds the preheat-bake arm in the preheat position when the knob is moved away from the broil position to a selected temperature. Prior to the reaching of this selected temperature, the expansion of the diaphragm will move the primary lever to disengage the shoulder from the main lever to allow the U-shaped member and its preheat-bake arm to move the preheat-bake contacts to the baking position.

Further objects and advantages of the present invention will be apparent from the following description, reference being had to the accompanying drawings, wherein a preferred form of the present invention is clearly shown.

In the drawings:

Fig. 3 is a sectional view taken along the lines 3—3 of Figs. 1, 6 and 7;

Fig. 4 is a bottom view of the frame and snap-action mechanism;

Figure 1:
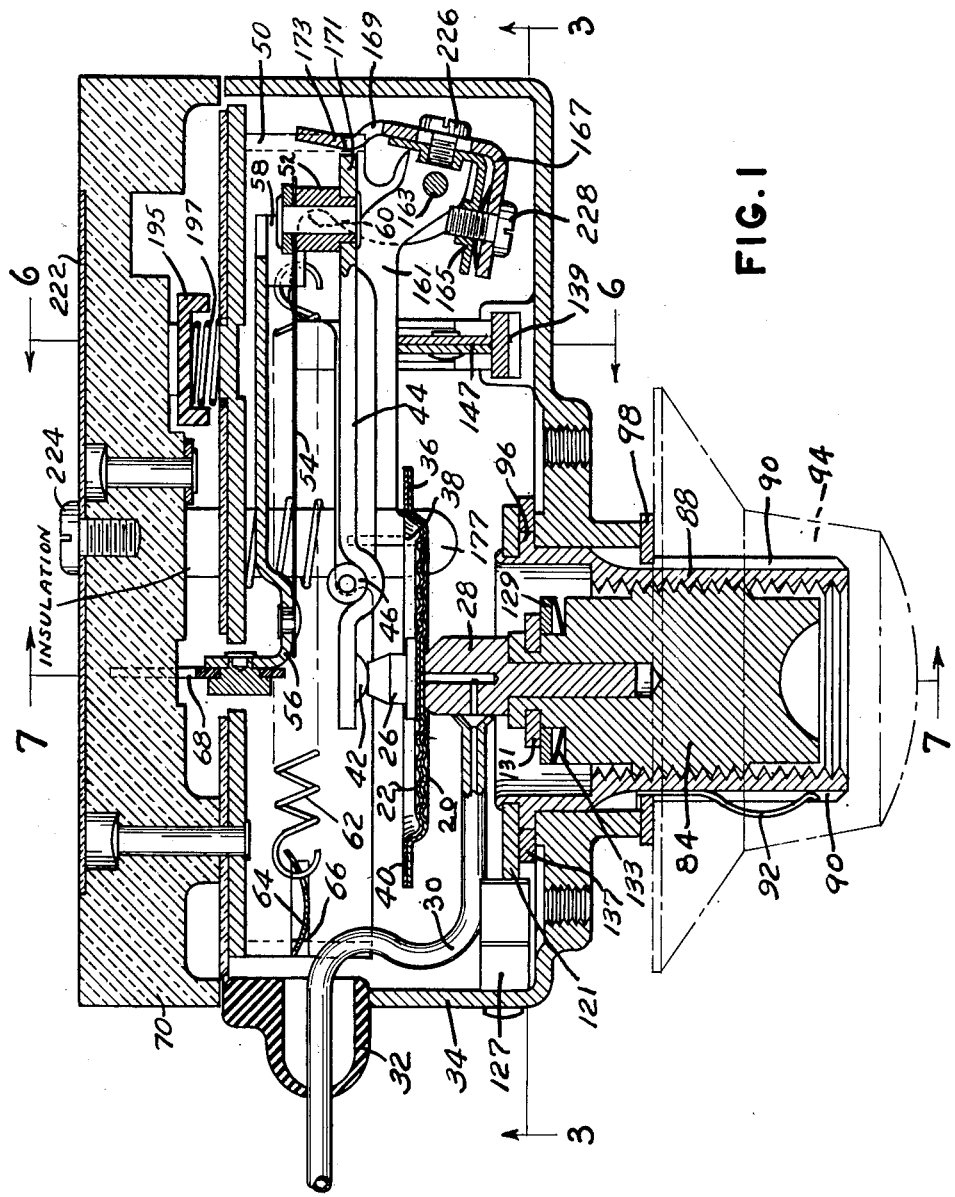
Fig. 1 is a sectional view taken along the lines 1—1 of Figs. 2 to 4, 6 and 7.

Referring now to the drawings and more particularly to Figs. 1, 3, 7, 8 and 9, there is shown a wafer type diaphragm means 20 preferably made of a thin upper nickel iron chrome alloy disk 22, and a thin lower nickel iron chrome alloy disk 24. The central portion of the upper disk is preferably welded or otherwise bonded to a follower 26. The central portion of the lower disk 24 is provided with a small aperture which registers with a tiny central aperture in the hub 28 to which it is welded or otherwise bonded. A radial transverse passage in this hub 28 connects the interior of the diaphragm means 20 with the capillary tube 30 which is provided with an offset and then extends through a rubber grommet 32 which fills an aperture in that portion of the lower case 34. The capillary tube 30 connects to a thermostat bulb located in heat exchange relation with the oven compartment. Preferably the end of the tube 30 is flared and projection-welded to the hub 28 as shown in Fig. 1. To facilitate this the side to which the tube 30 is connected is provided with a flat surface.

The portion of each of the diaphragms 22 and 24 immediately surrounding the follower portion of the oven portion are corrugated in concentric circles to increase their flexibility. Beyond this concentric corrugated portion, there is provided a wide offset flange which is offset from the corrugated portion an amount at least four times the height of the corrugations. The offset flange 36 has a width about equal to two corrugations and in the conventional 1½″ wafer diaphragm this amounts to a width of about .150″. To bond the offset flanges of the diaphragms 22 and 24 together, preferably a seam weld $\frac{3}{32}$″ in width is made entirely around the offset flange 36 to bond the flanges together. Preferably this weld is made about in the middle of the flange 36 and spaced from the outside edge of the flange about $\frac{1}{32}$″. The offset 38 protects the weld 40 from excessive stress and strain and provides added flexibility which prevents cracking of the diaphragms under life tests. Because the flange 36 is radial and flat the diaphragms are radially bonded together with a tight joint.

The follower 26 upon the upper diaphragm 22 engages a projection 42 upon the primary lever 44. The primary lever 44 is provided with a pin 46 which is welded in a transverse notch provided in the lever 44. This pin 46 has reduced end portions which are received in a pair of notches 48 provided in the lower edge of the frame 50. The primary lever 44 is provided with a longitudinal stiffening rib. At the end of the long arm of the lever 44 there is provided a post 52 to which is riveted one end of a thin metal tension member 54. This member 54 may have a longitudinal slot therein to improve its flexibility. The opposite end of this tension member is riveted to the contact end of the toggle lever 56. The opposite end of this toggle lever 56 is provided with a pair of offset ears 58 which ride in a pair of notches 60 in an adjacent portion of the frame 50. Also connected to these ears are a pair of tension toggle springs 62, the other ends of which are connected to a transversely curved thin metal anchoring member 64 mounted in a pair of slots 66 in the opposite sides of the frame 50.

Figure 2:
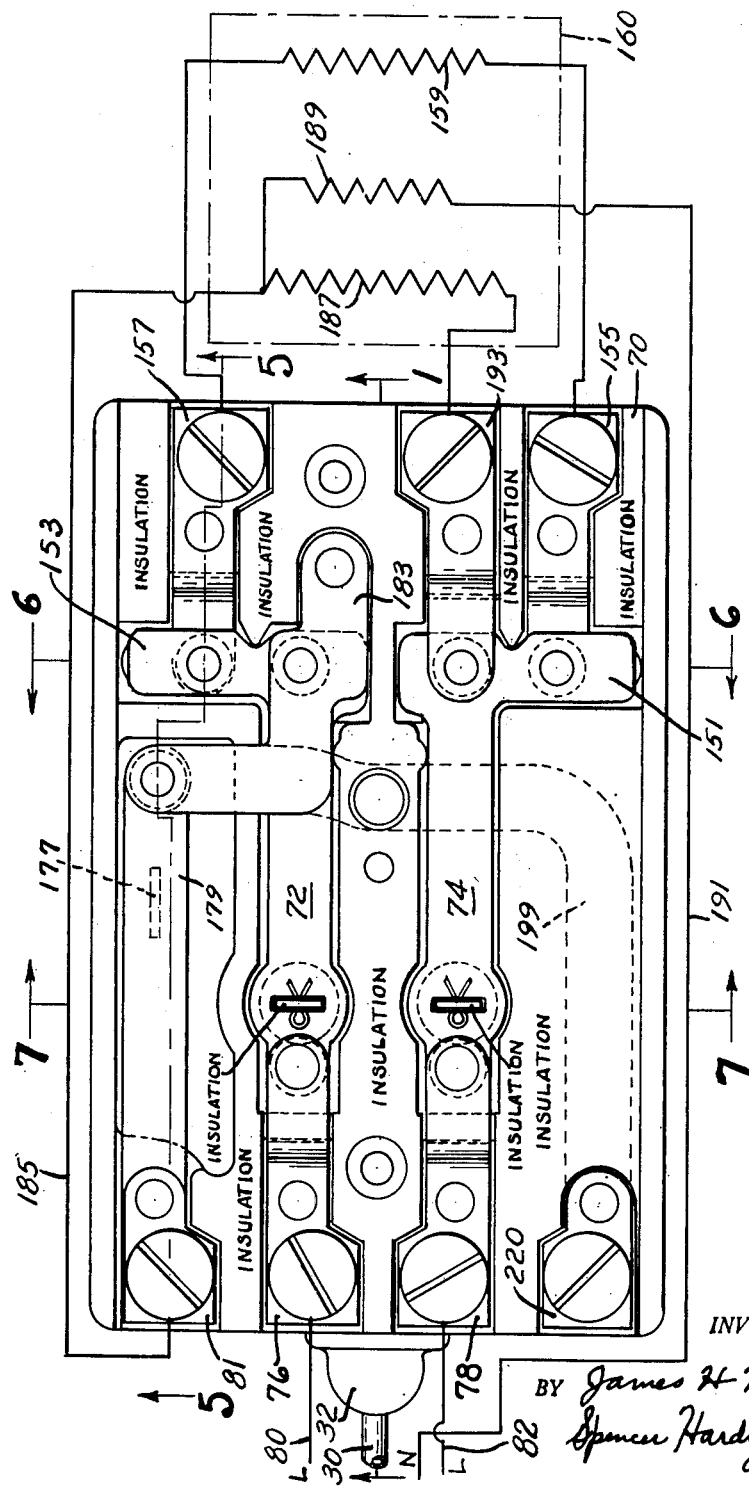
Fig. 2 is a top view with the cover removed of my improved control, together with a wiring diagram of an oven.
Figure 7:
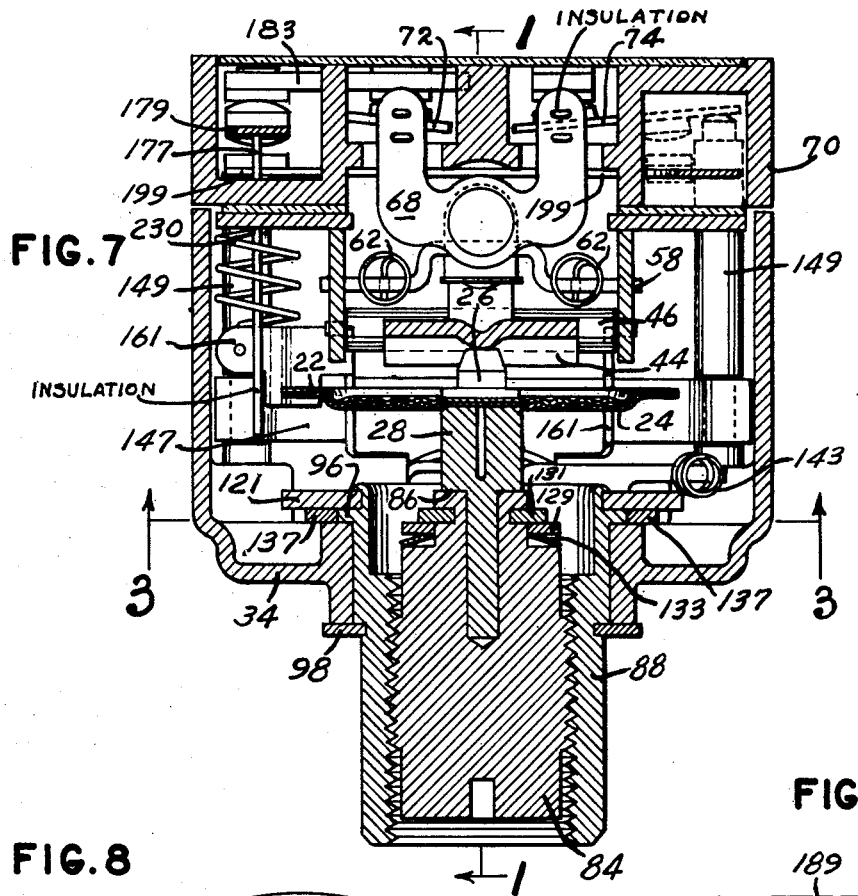
Fig. 7 is a sectional view taken along the lines 7—7 of Figs. 1 to 5.
Figure 8:
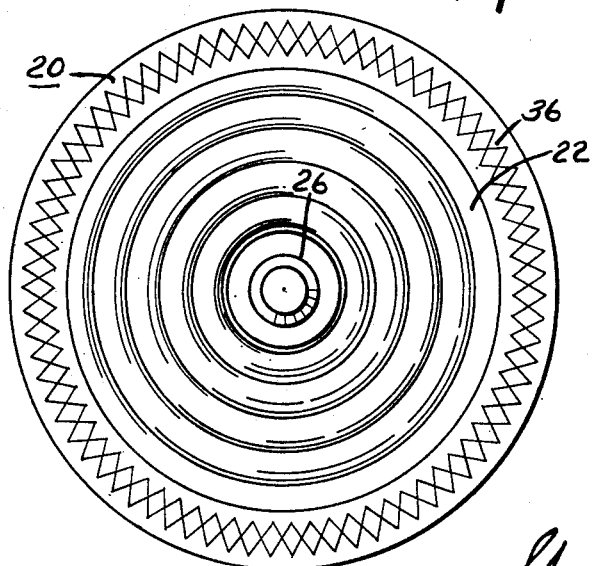
Fig. 8 is a top view of the diaphragm means.
Figure 9:
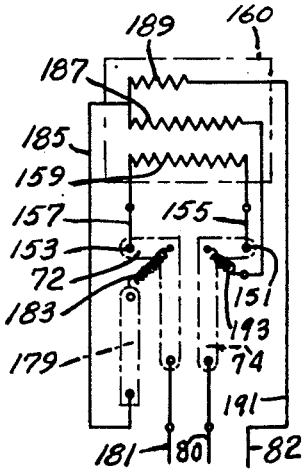
Fig. 9 is a wiring diagram for one type of oven circuit.

The contact end of the toggle lever 56 is turned up and has riveted to it a U-shaped member 68 of insulating material. This U-shaped member 68 extends through suitable apertures into the contact case 70 made of a suitable electrical insulating material such as porcelain. This U-shaped member 68 extends through transverse slots in a pair of L-shaped contact members 72 and 74 and is connected there by cotterpins above and below the members 72 and 74 as shown in Figs. 2 and 7. Beyond the slots the L-shaped contact members 72 and 74 are provided with contact buttons adapted to engage contact buttons on the lower side of the terminal members 76 and 78 which connect respectively to the two live supply conductors 80 and 82.

The diaphragm hub 28 has its lower end reduced in size to provide a pin-shaped projection which fits into an externally threaded plug 84 and a shoulder surrounding the projection which rests on the inner face 86 of the plug 84. The plug 84 is threaded into the internally threaded sleeve 88 having external grooves 90 and a curved leaf spring 92 for holding a suitable knob 94 indicated in dot and dash lines. The sleeve 88 is provided with an annular bead 96 on the inside of the casing 34 and is locked in place axially by a snap ring 98 which fits into the circumferential groove in the sleeve 88 and bears against a shoulder on the casing 34. This allows the sleeve 88 to be rotated relative to the case 34 but prevents it from being moved axially, although its assembly is made easy.

At one side of the bead 96 there is provided a cam 121 which is fixed to the sleeve 88 by riveting over the adjacent end. This cam 121 is provided with notches 123 and 125 which cooperate with the V-shaped portion of the leaf spring 127 riveted to the case 34 to provide a stop to limit the rotation of the knob at the "off" and "broil" positions at the two ends of the temperature range. A hump is provided between each of these notches and the remaining portion of the cam 121 so as to provide a definite feel or sensible indication when the spring 127 passes into the "off" or "broil" notches. The springs 127 also serve to provide sufficient friction to hold the knob 94 in any position to which it may be set.

To prevent normal rotation of the plug 84 an arm 129 is rotatably mounted thereon between a C-shaped washer 131 held within a groove in the plug 84, and a shoulder upon the plug 84. This plug 84 is normally prevented from rotating by a curved spring 133 which forces the arm 129 against the C-shaped washer 131 with sufficient force to prevent normal rotation of the plug 84 relative to the arm 129. The arm 129 is provided with an offset and extends radially outwardly. The end of the arm 129 is forked to receive one of the four spacing pins 135 which hold the frame 50 and the case 34 in proper relationship. The engagement of the forked end of the arm with the one spacing pin 135 allows the plug to move axially but the arm normally prevents its rotation unless a change in setting is desired.

When a change in setting is desired, the knob 94 is removed and the sleeve 88 is held. A screw driver is then inserted in the slot in the external end of the plug 84 and the plug 84 is turned with sufficient force to overcome the friction provided by the spring 133 to whatever new calibrating point is desired, to provide a different relationship between the sleeve 88 and the location of the diaphragm means 20. In making such a calibration adjustment it should be noted that all that is necessary is to remove the knob 94. No lock nuts or screws are required to be loosened.

Figure 6:
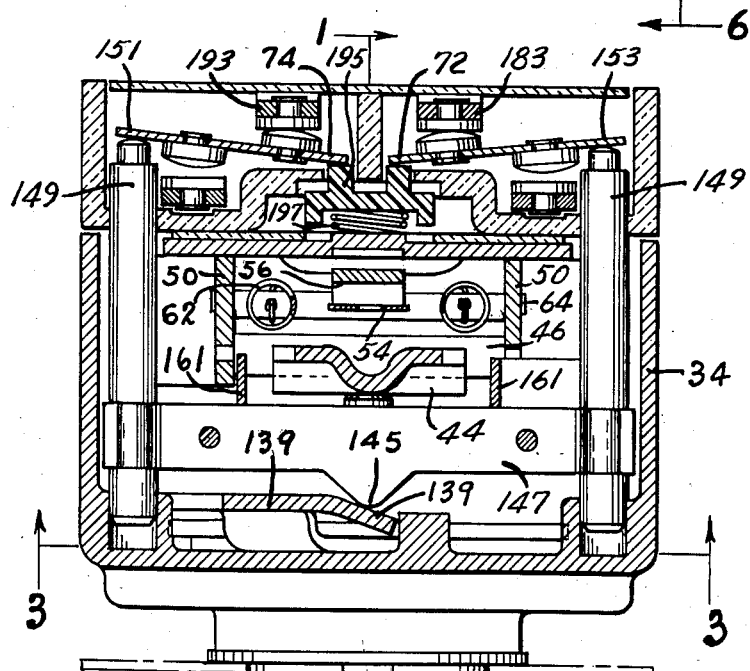
Fig. 6 is a sectional view taken along the lines 6—6 of Figs. 1 to 5.

Surrounding the bead 96 and held in place by the cam 121 is the hub 137 of a cam 139. In the broil position, this cam 139 is coupled through the use of a projection 141 fixed to and extending from the cam 121. The cam 139 is normally held in retracted position by a tension coil spring 143 which extends between an ear on the cam 139 and an arm extending from the leaf spring 127 which is fastened to the case 34. When the knob 94 is turned to the "broil" position, as shown in Fig. 3 the projection 141 engages the arm of the cam 139 to cause it as shown in Fig. 6 to engage the nose 145 of the cross member 147 which connects to the lower ends of the pins 149. These pins 149, when raised by the engagement of the cam 139 with the nose 145, lift the transverse legs 151 and 153 of the L-shaped contact members 74 and 72. These transverse legs 151 and 153 carry contact buttons adapted to make contact with the lower oven heating unit connecting terminals 155 and 157. These terminals 155 and 157 connect directly with the opposite ends of the lower heating unit 159. When the pins 149 are raised by the cam 139, the contact buttons on the legs 151 and 153 of the L-shaped contact members 74 and 72 are lifted from the terminals of the lower heating unit 159 so that there will be no danger of a shock by touching the lower oven heating unit 159 during the "broil" period.

The raising of the cross member 147 also raises a U-shaped member 161 which normally rests upon the cross member 147. This U-shaped member 161 is pivoted by the pin 163 to the frame 50. The yoke 165 of the U-shaped member 161 carries an adjustable member 167 provided with an aperture 169 which normally receives the tongue 171 at the extreme end of the primary lever 44. The upper end of the aperture 169 normally limits the upward or counterclockwise movement of the primary lever 44. However, when the control knob 94 is turned to the broil position, the shoulder 173 at the upper end of the aperture 169 is moved away from the tongue 171 to allow the tongue 171 to rise above the upper end of the aperture 169 directly opposite the shoulder 173. When the knob 94, after being first set to the "broil" position, is then returned to the temperature selected for baking, the U-shaped member 161 is prevented from following the cross member 147 downwardly by the engagement of the end of the tongue 171 with the shoulder 173.

One leg 175 of the U-shaped member 161 projects through a slot in a push bar 177 which extends upwardly through an aperture in the contact case 70 into engagement with the blade of the preheat-bake switch 179 anchored at the one end to the preheat-bake terminal 181. The free end of the blade 179 carries contact buttons above and below. A coil spring 230 is wrapped around the push bar 177 between the leg 175 and the flange of the frame 50 to normally hold the push bar 77 and blade 179 in their lower positions. In the upper position of the blade 179 the contact buttons engage a stationary contact member 183 which extends to a point over the junction of the two legs of the L-shaped contact member 72. A contact button upon each of the members 72 and 183 at this point provides a point of electrical connection between these members and also serves as a means for pivoting either of the legs of the L-shaped member 72.

The terminal 181 is connected by a conductor 185 to an intermediate point of the two connected upper heating unit sections 187 and 189. The other end of the section 189 is connected by the conductor 191 to the neutral supply conductor and through this circuit all of the heating elements are grounded when the contacts 72 and 74 are open. The other end of the other upper heating unit section 187 is connected directly to the terminal 193 which has a contact button over the contact button at the junction of the two legs of the L-shaped contact member 74. The junction of the two legs of each of the L-shaped contact members are held in contact with the members 183 and 193 by a spring-backed member 195 of an electrical insulating resin beneath which is a small coil spring 197. As is better shown in Fig. 6 this member 195 has two projections extending through two apertures in the bottom of the contact case 70, which extend into engagement with the extreme end portion of the junction of the two legs of the L-shaped contact members 72 and 74. This keeps the L-shaped contact members 72 and 74 electrically connected to the members 183 and 193 at all times.

A lower contact member 199 is provided in the switch which extends to a terminal 220 for using the switch with a different oven circuit arrangement. This terminal 220 may be connected to a tap upon a lower oven heating unit when a circuit is used like that shown in the Weimer Patent 2,218,778, issued Oct. 22, 1940. In this Patent 2,218,778 the tap is designated by reference character 24. The contact case is closed by a thin cover 222 of electrical insulating material which is normally held in place by a screw 224.

In normal operation, the thermostat is cold when the control is turned on. If quick preheating is not desired the knob is turned directly to the legend indicating the "bake" temperature desired. The setting of the knob 94 adjusts the position of the hub 48 and the diaphragm means 20 relative to the primary lever 44 to move the toggle 56 to open the switch contact 74 and 72 at the temperature selected. Under such circumstances the cam 139 as well as the cross member 147 and the U-shaped member 161 remain motionless and inactive in their lower positions. The opening temperature of the switch contacts may be adjusted so that they conform exactly to the setting of the knob 94 by holding the knob stationary at the setting desired and holding the sleeve 88 in the knob at the setting desired and turning the threaded plug 84 until the contacts 72 and 74 are open at the exact temperature desired. Since the threaded plug 84 can be turned to any desired point the adjustment is infinite within the range of operation of the switch.

For broiling the knob 94 is turned directly to the "broil" position and the projection 141 engages the arm of the cam 139 and forces it beneath the nose 145 of the cross member 147, as shown in Fig. 6, to raise the pins 149 to lift the transverse legs 151 and 153 of the L-shaped contact members 74 and 72 to disconnect them from the terminals 155 and 157 of the lower oven heating unit 159 located within the oven compartment 160. This connects the supply conductor 80 through the terminal 76, contact member 72 and the member 183 with the preheat-bake blade 179 which through the terminal 181 and the conductor 185 connects to the upper heating unit composed of sections 187 and 189. This connects unit 189 across the supply conductors 80 and 191. The other upper heating unit section 187 through the terminal 193, the contact 74 and the terminal 78, is connected to the other live supply conductor 82. If the voltage across the supply conductors 80 and 82 is 230 volts this voltage is impressed on the section 187 while 115 volts is impressed upon the section 189. This provides an adequate amount of heat for broiling purposes.

Figure 5:
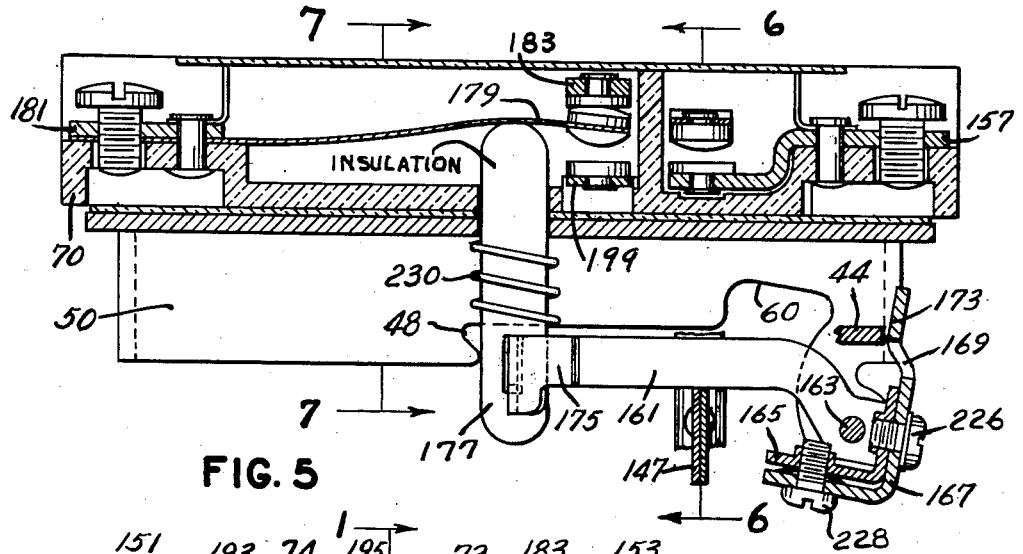
Fig. 5 is an irregular fragmentary sectional view taken in part along the lines 5—5 of Fig. 2 to show the preheat-bake switch mechanism.

For quick preheating the knob is first turned to the "broil" position and then immediately returned to the desired baking temperature. When this is done the hub 28 and the diaphragm means 20 are moved towards the knob 94 a sufficient distance so that the tongue 171 at the extreme end of the primary lever 44 rises above the upper end of the aperture 169 in the member 167. At the same time the cam 139 will lift the pins 149 as explained for the "broil" position, but as soon as the knob is turned away from the "broil" position they will be dropped and returned to the "bake" position. In the "broil" position the U-shaped member 161 is also lifted by the cross member 147, but when the knob 94 is returned to the selected baking temperature the U-shaped member 161 does not follow the return of the cross member 147 to its original lower position but is held in its upper or preheat position by the engagement of the end of the tongue 171 with the shoulder 173 of the member 167. The position of the shoulder 173 may be adjusted by loosening the screw 228 (see Fig. 5) and turning the screw 228 until the shoulder 173 is positioned at the proper point to be held by the tongue 171 when the knob 94 is turned to the "broil" position and to be released at a temperature and position of the tongue just prior to the tripping temperature and position. This holds the U-shaped member 161 as well as the push bar 177 and the preheat-bake blade 179 in the preheat circuit position against the force of the coil spring 230 which is wrapped around the push bar 177.

In the preheat position, the upper heating unit is energized as in the "broil" position, but since the pins 149 have been dropped the contacts 72 and 74 are again in contact with the terminals 157 and 155, so that the lower oven heating unit 159 is energized at the full line voltage. As the oven compartment 160 is heated to a temperature approaching that for which the knob 94 is set, the wafer diaphragm 20 will be expanded sufficiently to cause the tongue 171 to move from the shoulder 173 into aperture 169. This will permit the spring 230 to push the U-shaped lever downwardly so that the blade 179 will be enabled to make contact with the contact member 199. When the temperature is reached for which the knob 94 is set, the post 52 will, through the tension member 54, pull the contact end of the toggle lever 56 across its dead center position to open the contacts 72 and 74. Sufficient cooling of the oven compartment 160 will cool the thermostat bulb sufficiently to contract the wafer diaphragm means 20 to move the toggle member 56 back across the dead center position to close the contacts 72 and 74. When this is done the lower oven heat unit 159 is connected directly across the two live supply conductors 80 and 82 as before. However, the preheat-bake blade 179 remains in its lower position against the contact 199 thereby keeping the conductor 185 disconnected from the live supply conductor 80. The current from the upper heating unit is then supplied from the live supply conductor 82 through the terminal 78, the contact 74, the terminal 193 to the upper oven heating unit section 187 through which the current flows to the other upper heating unit section 189 which is connected to the neutral conductor 191. This arrangement then connects the two upper heating units 187 and 189 in series across the conductors 82 and 191 impressing a voltage of nominally 115 volts to provide a small amount of top heat for good baking conditions.

While the form of embodiment of the invention as herein disclosed, constitutes a preferred form, it is to be understood that other forms might be adopted, as may come within the scope of the claims.

What is claimed is as follows:

1. A control including an actuating means in the form of two thin metal disks each having a radial flange, said flanges being bonded together throughout an entire circle, a concentrically located hub fastened to one of said disks, a threaded member provided with a rotatable connection with said hub, frictional means for normally preventing the rotation of said threaded member, a rotatably mounted member in threaded engagement with said threaded member for changing the location of said disks, and means for preventing axial movement of the rotatably mounted member.

2. A control including a diaphragm means, a concentrically located hub fastened to said diaphragm means, a threaded member provided with a rotatable connection with said hub, frictional means for normally preventing the rotation of said threaded member, a rotatably mounted member in threaded engagement with said threaded member for changing the location of said diaphragm means and means for preventing axial movement of the rotatably mounted member.

JAMES H. NELLIS.

References Cited in the file of this patent

UNITED STATES PATENTS

| Number | Name | Date |
|---|---|---|
| 800,945 | Scott | Oct. 3, 1905 |
| 1,561,065 | Eggleston | Nov. 10, 1925 |
| 1,836,634 | Urfer | Dec. 15, 1931 |
| 1,966,537 | Binckley | July 17, 1934 |
| 1,978,362 | Fonseca | Oct. 23, 1934 |
| 2,123,829 | Grayson | July 12, 1938 |
| 2,237,530 | Olley | Apr. 8, 1941 |
| 2,289,020 | Jones | July 7, 1942 |
| 2,295,427 | Puster | Sept. 8, 1942 |
| 2,338,271 | Ulanet | Jan. 4, 1944 |
| 2,347,185 | Fentress | Apr. 25, 1944 |
| 2,385,434 | Weber | Sept. 25, 1945 |
| 2,402,354 | Waddell | June 18, 1946 |